United States Patent Office 3,299,089
Patented Jan. 17, 1967

3,299,089
DERIVATIVES OF 5-METHYLOXAZOLINE AND
5-CHLOROMETHYLOXAZOLINE
Rolf Zimmermann, Wiesbaden-Biebrich, Alfred Englisch, Opladen-Lutzenkirchen, and Conrad Koch, Dusseldorf-Benrath, Germany, assignors to Chemische Werke Albert, Wiesbaden-Biebrich, Germany, a corporation of Germany
No Drawing. Filed Feb. 5, 1964, Ser. No. 347,067
Claims priority, application Germany, Feb. 6, 1963, C 29,096
14 Claims. (Cl. 260—307)

This invention is concerned with improvements in or relating to compounds having anti-convulsive and plant growth regulating properties, in particular it is concerned with derivatives of 5-methyl-oxazoline and 5-chloromethyl-oxazoline and with a process for their manufacture.

It has been proposed to produce 5-chloromethyl-oxazolidinylidene-2-anilino-thioformylimide or 5-chloromethyl-oxazolidinylidene-2-allylaminothioformylimide by refluxing an alcoholic solution of 5-chloromethyl-oxazolidylidene-2-imide with an equivalent amount of phenyl-isothiocyanate or allylisothiocyanate. The same compounds are obtained if the reaction is carried out at room temperature and the reaction product is recrystallized from alcohol or boiled therein for some time. 5-chloromethyl-oxazolidinylidene-2-anilinothioformylimide and 5-chloromethyl - oxazolidinylidene - 2 - allylaminothioformylimide have neither a muscle relaxant nor an antiepileptical effect.

We have now found that certain derivatives of 5-methyl-oxazoline which contain no oxo-oxygen are effective both as plant growth regulators and as anti-convulsants, e.g., anti-epileptics or muscle relaxants.

According to the present invention therefore there are provided compounds of the general formula

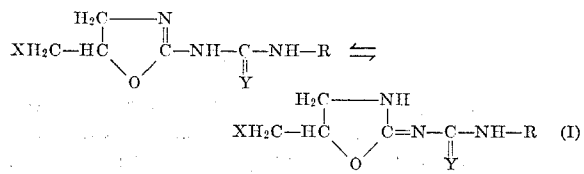

in which X represents hydrogen or chlorine, and either (A) R is an alkyl radical from 1 to 6 carbon atoms, or an alkyl radical having from 1 to 6 carbon atoms substituted by at least one alkoxy group having from 1 to 4 carbon atoms and Y is sulphur or (B) R is a mononuclear or dinuclear aryl radical or a mononuclear or dinuclear aryl radical substituted by at least one alkyl or alkoxy radical having from 1 to 4 carbon atoms and Y is oxygen. Where R is an alkyl radical it preferably has from 2 to 4 carbon atoms.

When R is an alkyl radical it may thus be a methyl, ethyl, propyl (primary, secondary, tertiary or iso), butyl or hexyl radical. An example of an alkoxy substituted alkyl radical is 3-methoxypropyl. In case (B) above R may be a phenyl, diphenylyl or naphthyl radical or a derivative thereof containing a methyl, ethyl, propyl or isopropyl radical, or a corresponding alkoxy radical. Examples are the o-, m- or p-methoxy or ethoxy or propoxy-phenyl radical and the tolyl, xylyl, ethylphenyl. The unsubstituted radicals, such as the phenyl or naphthyl radical are, however, generally preferred. If R represents an aliphatic radical substituted by an alkoxy group, the total radical R has preferably not more than 6 carbon atoms. The alkoxy groups may thus be the methoxy, ethoxy, n- or iso-propoxy or a primary, secondary, tertiary or iso-butoxy radical; the alkyl radical may be straight-chained or branched.

Preferred compounds according to the present invention are:

N-phenyl-N'-2-(5-chloromethyl-oxazolinyl)-urea
N-(m-tolyl)-N'-2-(5-chloromethyl-oxazolinyl)-urea
N-(3-methoxypropyl)-N'-2-(5-chloromethyl-oxazolinyl) thiourea.

The compounds of the present invention may be produced by reacting an oxazolidinylidene-imide (2-amino-oxazoline) of the formula

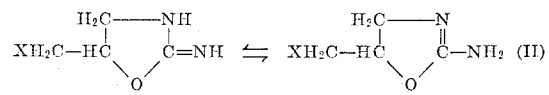

with a compound of the formula R—N=C=Y, in which R and Y have the meanings given above at a temperature above about 40° C. The process may for example be carried out in the presence of a solvent boiling above about 40° C.

If the isocyanates or isothiocyanates are liquid at ambient temperatures the two components may be mixed with each other without using a solvent. The reaction occurs while the mixture is warmed above 40° C. by itself. Otherwise an inert solvent which boils above 40° C. may be used, for example benzene, toluene, chloroform, or carbon tetrachloride. Preferably, equimolecular amounts are reacted under substantially anhydrous conditions. The yield is good, occasionally almost quantitative.

According to a modification of the process of the present invention the compounds thereof may be prepared by carrying out the reaction at room temperature; the reaction product is then either recrystallised from a solvent above 40° C. or is warmed alone to a temperature above 40° C.

The compounds according to the invention may be formulated for use in any convenient way, and the invention thus includes within its scope a composition suitable for use in human or veterinary medicine or alternatively for use in horticulture or agriculture, comprising the compound in association with an appropriate carrier or diluent. Such compositions when used in human medicine may be presented for use in conventional manner with the aid of any necessary recipients, i.e., pharmaceutical carriers of liquid or solid nature.

It is known that 2-oxazolidones of the formula

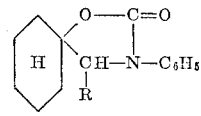

in which R means a saturated aliphatic substituent have an anticonvulsive, i.e., a muscle relaxant effect. It is also known that certain oxazolidones, i.e., those which contain in 5-position aryloxymethyl radicals or in 4- or 5-position aromatic substituents, have an anticonvulsive effect. (Journal American Chemical Soc., volume 82 (1960), 1166–1171, and volume 73 (1951), 95–98.) The fact that compounds obtained according to the invention show a good anticonvulsive effect is especially surprising, since it is stated on the last-mentioned passage (page 96) that compounds, which contain aliphatic substituents in 4- and/or 5-position, for example the 5-chloromethyl radical, are either ineffective or only very little effective.

It is further known that oxazolidine-2-thiones are suitable for defoliants and oxazolidinones which are free from halogen or contain 4-chlorobenzyl groups as plant growth regulators. The fact that the compounds of the invention which contain no oxo-oxygen are suitable as plant growth regulators could not be deduced therefrom.

The invention will now be illustrated by the following examples:

EXAMPLE 1

N-phenyl-N'-2-(5-chloromethyl-oxazolinyl)-urea

Method (a) 13.4 g. of 2-amino-5-chloromethyl-oxazoline are added with stirring to 11.9 g. of phenylisocyanate. The mixture is warmed by itself. The reaction mixture is then kept for 10 hours in a desiccator. The solidified mass obtained is recrystallized from toluene if desired several times. N-phenyl-N'-2-(5-chloromethyl-oxazolinyl)-urea is obtained having a melting point of 164 to 165° C.; yield about 10 g.

Method (b) A solution of 8.85 g. of phenylisocyanate in 50 ml. of toluene is aded dropwise with stirring to a suspension of 10 g. of 2-amino-5-chloromethyl-oxazoline in 200 ml. of toluene. Thereafter the mixture is warmed for 40 minutes on a steam bath during which time N-phenyl-N'-2-(5-chloromethyl-oxazolinyl) - urea starts to precipitate as fine, white needles; further precipitation occurs on cooling. On recrystallizing from toluene a product having a melting point of 165° C. is obtained. Yield: 92% of the theory.

EXAMPLE 2

N-(m-tolyl)-N'-2-(5-chloromethyl-oxazolinyl)-urea 12 g. of 5-chloromethyl-2-amino-oxazoline are dissolved in 90 g. of toluene and a mixture of 13.35 g. of m-tolylisocyanate with 10 g. of toluene is added dropwise during 5 minutes. The mixture is then heated for 3 hours on a water bath. After cooling, the resulting solution is filtered. After a short time the n-(m-tolyl)-N'-2-(5-chloromethyl-oxazolinyl)-urea crystallizes in the form of white needles. After recrystallisation from methanol this compound melts at 144.5 to 145° C. Yield: 18.3 g., i.e., 75% of the theory.

EXAMPLE 3

N-(1-naphthyl)-N'-2-(5-chloromethyl-oxazolinyl)-urea 4 g. of 1-naphthylisocyanate are dissolved in 30 g. of toluene and added dropwise with stirring to 4 g. of 5-chloro-methyl-2-amino-oxazoline. The temperature rises up to 40° C. Thereafter the mixture is heated for one hour under reflux conditions. The resulting solution is then distilled at reduced pressure using a water-jet vacuum pump until a crystalline residue remains. After recrystallization from toluene 6.5 g. of N-(1-naphthyl)-N'-2-(5-chloromethyl-oxazolinyl)-urea are obtained in the form of white crystals, melting point 160–161° C. Yield: 72% of the theory.

As is shown by Table I the products of Examples 1 to 3 are effective as antiepileptics. Their toxicity to mice is favorable.

TABLE I

| Product of Example No. | LD$_{50}$ in mg./kg. | ED$_{50}$ in mg./kg. | Therapeutic Index LD$_{50}$/ED$_{50}$ |
| --- | --- | --- | --- |
| 1 | 1,700 i. p. Above 10,000 per os. | 90 i. p. 140 per os | 18.9 Above 71 |
| 2 | 2,500 i. p. | 144 i. p. | 17.4 |
| 3 | 1,160 i. p. | 65 i. p. | 17.8 |
| Phenobarbital | 280 i. p. 180 per os | 20 i. p. 18 per os | 14.0 10.0 |
| Trimethadion | 1,950 i. p. 1,750 per os | 205 i. p. 62 per os | 9.5 28.2 |

In Table I "i.p." means intraperitoneally. The LD$_{50}$ and ED$_{50}$ per os data of phenobarbital and trimethadion were taken from the publication of Wirth, Hoffmeister, Friebel and Sommer, "Deutsche Medizinische Wochenschrift," volume 85 (1960) 2195. Phenobarbital (III) and trimethadion (IV) have the following formulae:

(III) 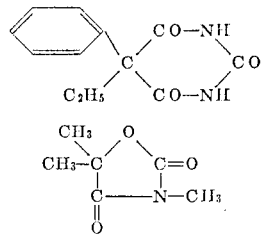

(IV) 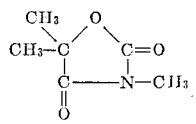

EXAMPLE 4

N-phenyl-N'-2-(5-methyl-oxazolinyl)-urea 5 g. of 5-methyl-2-amino-oxazoline, dissolved in 10 g. of toluene, are mixed with 6 g. of phenylisocyanate in 10 g. of toluene. On combining both mixtures the temperature rises to 67° C. Thereafter the solution is heated for 2 hours to 100–110° C. After cooling the reaction mixture, 11 g. of a white greasy residue are obtained. This residue is recrystallized three times from a mixture of equal parts by volume of carbon tetrachloride and chloroform. 7.8 g. of N-phenyl-N'-2-(5-methyl-oxazolinyl)-urea are obtained in the form of white flakes having a melting point of 162–163° C. Yield: 71% of the theory.

EXAMPLE 5

N-n-propyl-N'-2-(5-methyl-oxazolinyl)-thiourea 4.5 g. of 5-methyl-2-amino-oxazoline and 4 g. of n-propyl-isothiocyanate are dissolved in 25 g. of toluene and are heated for 2 hours to 110° C. Thereafter the toluene is distilled off in vacuo. 10.5 g. of a residue are obtained, which after recrystallization from a mixture of isopropanol and petroleum ether in a volume ratio of 5:1 melts at 96–96.5° C. N-n-propyl-N'-2-(5-methyl-oxazolinyl)-thiourea is obtained in the form of white crystals in a yield of 67% of the theory.

EXAMPLE 6

N-(o-ethoxyphenyl)-N'-2-(5-methyl-oxazolinyl)-urea

A solution of 5 g. of 5-methyl-2-amino-oxazoline in 10 g. of toluene is mixed with a solution of 8.15 g. of o-ethoxy-phenyl-isocyanate in 10 g. of toluene. An exothermic reaction occurs and the temperature rises to 45° C. Thereafter the mixture is heated under reflux for 2 hours. After distilling off the solvent, a crystalline residue remains which, after recrystallisation from a mixture of toluene and petroleum ether in a volume ratio of 10:1, melts at 146° C. White crystals: Yield 8 g. of N-(o-ethoxyphenyl)-N'-2-(5-methyl-oxazolinyl)-urea, i.e. 61% of the theory.

EXAMPLE 7

N-(3-methoxypropyl)-N'-2-(5-chloromethyl-oxazolinyl)-thiourea 6.6 g. of 3-methoxypropyl-isothiocyanate and 6.9 g. of 5-chloromethyl-2-amino-oxazoline are heated together with 40 g. of toluene for 2 hours under reflux. After distilling off the solvent, a partially crystalline residue remains. This residue is dissolved in hot isopropanol and precipitated with petroleum ether. On cooling the solution with a mixture of ice and common salt white crystals are obtained which after reprecipitation from a mixture of isopropanol and petroleum ether melt at 100° C. Yield: 10.3., g., 75% of the theory, of N-(3-methoxypropyl)-N'-2-(5-chloromethyl-oxazolinyl)-thiourea.

The muscle relaxant effect of some of the substances of the invention in the strychnine test on mice is shown in Table II. As comparison samples chlorozoxazone (5-chlorobenzoxazolone-2) of the formula

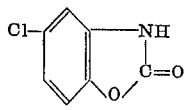

and phenobarbital were used. The effectiveness was characterized by the therapeutic index. As is shown by Table II the compounds of the invention were more effective for extension spasm initiated by strychnine than chlorozoxazone and phenobarbital. The compounds of Examples 1, 2 and 7 had the best effect. The substances of Examples 1 and 2 were especially compatible.

A similar observation is made when comparing the influence of death caused by strychnine. The compounds of Examples 1 and 2 here also showed the best effect, followed by the compounds of Examples 3 and 7.

TABLE II

| Products of Example No. | LD$_{50}$ in mg./kg. (i.p. unless otherwise indicated) | ED$_{50}$ in mg./kg. (i.p. unless otherwise indicated) | | Therapeutic index LD$_{50}$/ED$_{50}$ | |
|---|---|---|---|---|---|
| | | Extension spasm | Mortality | Extension spasm | Mortality |
| 1 | 1,700 | 84 | 83 | 20.2 | 20.5 |
| | above 10,000 per os | 88 | 75 | about 113 | about 133 |
| 2 | 2,500 | 130 | 90 | 19.2 | 27.8 |
| 3 | 1,160 | 85 | 60 | 13.6 | 19.3 |
| 4 | 760 | 80 | 64 | 9.5 | 11.9 |
| 5 | 620 | 86 | 36 | 7.2 | 17.2 |
| 7 | 1,130 | 63 | 62 | 17.9 | 18.2 |
| Phenobarbital | 280 | 41 | 21 | 6.8 | 13.3 |
| | 188 per os | 42 | 21 | 4.5 | 9.0 |
| Chlorozoxazone | 780 | 145 | 89 | 5.4 | 8.8 |

In this table LD means "lethal dose" and ED "effective dose" ED$_{50}$ indicates the dose at which the spasm is suppressed in 50% of the tested animals. LD$_{50}$ indicates the dose at which 50% of the tested animals die. The abbreviation "i.p" means intraperitoneally.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What is claimed is:
1. Compounds of the general formula

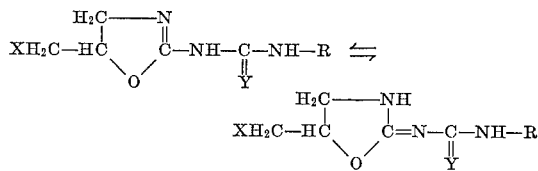

wherein X is selected from the group consisting of hydrogen and chlorine and R and Y are present in a combination selected from the group consisting of (A) Y representing oxygen and R one of the radicals at most dinuclear unsubstituted aryl hydrocarbon and at most dinuclear aryl hydrocarbon which is substituted by at least one and at most two of the substituents alkyl and alkoxy, each having from 1 to 4 carbon atoms, and (B) Y representing sulfur and R one of the radicals alkyl having from 1 to 6 carbon atoms and alkyl having from 1 to 6 carbon atoms substituted by an alkoxy group having from 1 to 4 carbon atoms.

2. Compounds as claimed in claim 1, where X is hydrogen.

3. Compounds of the general formula

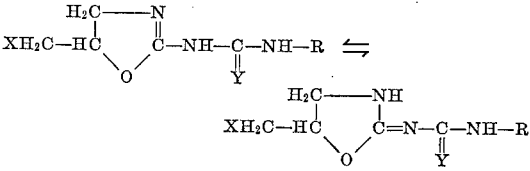

where X is selected from the group consisting of hydrogen and chlorine, Y is oxygen and R is an at most dinuclear unsubstituted aryl hydrocarbon.

4. Compounds as claimed in claim 3, where R is phenyl.
5. Compounds as claimed in claim 3, where R is naphthyl.
6. Compounds as claimed in claim 1, where R is m-tolyl and Y is oxygen.
7. Compounds as claimed in claim 1, where Y is sulfur and the total radical R has not more than 6 carbon atoms.
8. N-phenyl-N'-2-(5-chloromethyl-oxazolinyl)-urea.
9. N-(m-tolyl-N'-2-(5-chloromethyl-oxazolinyl)-urea.
10. N-(1-naphthyl)-N'-2-(5-chloromethyl - oxazolinyl)-urea.
11. N-phenyl-N'-2-(5-methyl-oxazolinyl)-urea.
12. N-n-propyl-N'-2-(5-methyl-oxazolinyl)-thiourea.
13. N-(o-ethoxyphenyl)-N'-2-(5-methyl - oxazolinyl)-urea.
14. N-(3-methoxypropyl)-N'-3-(5-chloromethyl - oxazolinyl)-thiourea.

References Cited by the Examiner
UNITED STATES PATENTS 2,661,272   12/1953   Searle _____ 260—552
3,162,644   12/1964   Englisch et al. _____ 260—307.4

OTHER REFERENCES

Burger, A.: Medicinal Chemistry, New York, Interscience, 1960, p. 78.

Fromm et al.: Justus Liebig's Annalen der Chemie, vol. 467 (1928), pp. 240–257.

ALEX MAZEL, *Primary Examiner.*

HENRY R. JILES, *Examiner.*

R. J. GALLAGHER, *Assistant Examiner.*